(12) United States Patent
Gai et al.

(10) Patent No.: US 11,794,863 B2
(45) Date of Patent: Oct. 24, 2023

(54) ANTI-ROLL STABILIZER DEVICE FOR BOATS

(71) Applicant: Ultraflex S.p.A., Casella (IT)

(72) Inventors: Marcella Gai, Busalla (IT); Fabio Staglianò, Genoa (IT); Roberto Rossi, Varazze (IT); Massimo Verme, Lavagna (IT)

(*) Notice: Subject to any disclaimer, the term of this patent is extended or adjusted under 35 U.S.C. 154(b) by 34 days.

(21) Appl. No.: 17/501,975

(22) Filed: Oct. 14, 2021

(65) Prior Publication Data

US 2022/0119079 A1   Apr. 21, 2022

(30) Foreign Application Priority Data

Oct. 19, 2020  (IT) .................... 102020000024571

(51) Int. Cl.
  *B63B 39/04*   (2006.01)
(52) U.S. Cl.
  CPC .................................. *B63B 39/04* (2013.01)
(58) Field of Classification Search
  CPC ........ B63B 39/04; F16C 35/042; F16C 19/38; F16C 19/541; F16C 23/086; F16C 2326/30; F16C 37/007; F16C 2370/00; F16F 15/02; F16F 15/30; H02K 5/203; H02K 7/02; H02K 2201/18; G01C 19/02; Y02E 60/16
  USPC ........................................................ 114/122
  See application file for complete search history.

(56) References Cited

U.S. PATENT DOCUMENTS 1,342,397 A  6/1920  Sperry
1,605,289 A  11/1926  Schein
2,104,226 A  1/1938  Gonzales
3,066,634 A * 12/1962  Suberkrub .............. B63B 39/06
                                                    114/126
9,651,315 B2 * 5/2017  Cui ........................ F28F 13/125
10,228,198 B2 * 3/2019  Reshetnyak ............ F28F 9/001
2018/0051988 A1  2/2018  Miocevich

FOREIGN PATENT DOCUMENTS

CN       104578595      4/2015
CN       110198092      9/2019
WO       2020199946     10/2020

OTHER PUBLICATIONS

Italian Patent and Trademark Office, Search Report, dated Jun. 7, 2021 (Relevant portions are in English).

* cited by examiner

*Primary Examiner* — Daniel V Venne
(74) *Attorney, Agent, or Firm* — Themis Law

(57) ABSTRACT

An anti-roll stabilizer device for boats includes a container adapted to be mounted on a suspension so as to oscillate around a first axis; a mass rotatably supported inside the container so as to form a rotor that rotates around a second axis transverse to the first axis; and a rotor cooling system having a hollow shaft arranged along the second axis, a first and a second cooling chamber sealed from the container of the rotor and from the outside, arranged at the ends of the hollow shaft and communicating through the hollow shaft, the first chamber having an inlet and the second chamber an outlet that are connected to a forced circulation circuit of the cooling fluid so that the cooling fluid can circulate from the first chamber to the second chamber through the hollow shaft and from the second chamber to the first chamber through the circulation circuit.

17 Claims, 8 Drawing Sheets

ANTI-ROLL STABILIZER DEVICE FOR BOATS

FIELD OF THE INVENTION

The present invention relates to an anti-roll stabilizer device for boats with improved heat exchange.

BACKGROUND OF THE INVENTION

Anti-roll stabilizers are devices installed inside the hulls of boats near the bottom.

These devices benefit from the gyroscope physical principle that a rotating mass offers greater opposition to an external force attempting to change its trajectory.

The gyroscope of an anti-roll stabilizer typically comprises a flywheel, i.e. a mass with high moment of inertia, which, driven by an electric motor, rotates around an axis inside a case or a container free to oscillate along a transversal axis with respect to the rotation axis. By effect of the law of conservation of angular momentum, the gyroscope tends to keep its rotation axis oriented in a fixed direction, opposing in this way to a possible force that tends to make the gyroscope oscillate along the transversal axis. Hence its use in boating to counteract the oscillations to which a boat is subjected, in particular the rolling imposed by wave motion.

A gyro stabilizer is more effective the greater its angular momentum. The angular momentum is directly proportional to the moment of inertia of the rotating rigid body and to its angular velocity. In turn, the moment of inertia is a function of the mass and geometry of the rigid body.

Consequently, given the shape of the rotor, in order to obtain large angular moments and, therefore, a greater stabilizing effect, it is necessary to act either on the mass or on the speed of rotation of the rotor.

In small boats, the rotor mass cannot be too great so the only way to get enough angular momentum to achieve the desired anti-roll effect is to increase the rotational speed.

This, however, results in high heating of the device due to friction.

In order to overcome this problem, it is therefore necessary, on the one hand, to reduce friction as much as possible and, on the other hand, to dissipate the heat generated.

A well-known technique involves immersing the rotor, or at least its support bearings, in an oil bath. This achieves the dual effect of reducing friction and draining heat.

On the other hand, this solution is complex and requires more rotor driving energy to overcome the viscous force due to the presence of oil.

For this reason, in more recent devices, friction reduction is typically achieved by housing the rotor in a vacuum chamber. Since at high speeds friction with air is significant, this is certainly a good solution.

On the other hand, the vacuum limits thermal transmission, therefore, the possibility of dissipating the heat that accumulates in the sealed chamber that houses the rotor, particularly in correspondence of the bearings that support it.

Document EP1979708A, on which the preamble of the first claim is based, describes a way of transferring the heat of the rotor towards the outside by employing a pair of discs, one of which is stationary integral with the container housing the rotor and one rotating integral with the rotor, provided with grooves and complementary annular protrusions that engage each other so as to facilitate the heat exchange between the rotor and the external environment.

This technique, although effective, doesn't however provide comparable result in terms of heat dissipation with those solutions that involve heat drainage through the lubrication oil.

In document US 2018/051988A1 the inventors disclose of a boat stabilizer gyroscope comprising a rotating mass from a shaft 19 and a flywheel 11, two cooling chambers 22 and 24 to contain respective bearings to which a cooling oil circuit is associated. However, this configuration has limitations for the management of the cooling oil flow and the need is further felt to improve the cooling efficiency without complicating but rather simplifying the stabilizer structure.

Extending the field of stabilizers to flywheels used as energy storage, patent application CN104578595A shows a FES (flywheel energy storage) provided with a rotating mass in a vacuum-sealed structure and two chambers at the longitudinal ends of the rotor for cooling the rolling bearings; the rotor is hollow in the central part close to the rotation axis and such cavity allows the fluid to pass between the two chambers for cooling the bearings. This solution makes it possible to simplify the structure of the cooling system but entails an increase in the constructional complexity required to guarantee the vacuum seal of the structure housing the rotor which, rotating quickly and for long periods, leads to wear of the insulation seals between the vacuum zone and the chamber in which the cooling fluid is under pressure.

SUMMARY OF THE INVENTION

The purpose of the present invention is to realize a boat stabilizer device with optimized heat dissipation.

The invention achieves the purpose with an anti-roll stabilizer device for boats comprising:
  a container adapted to be mounted on a suspension so as to be able to oscillate around a first axis (X);
  a mass rotatably supported inside said container so as to form a rotor which rotates around a second axis (Y), transversal with respect to the first axis (X);
  a fluid-filled rotor cooling system;
  the rotor being provided with a cylindrical cavity arranged along the second axis (Y) in which is housed a hollow shaft integral with the container around which said hollow shaft rotates;
  a first and a second cooling chambers sealed with respect to the container of the rotor and towards the outside, arranged at the ends of the hollow shaft and communicating through the hollow shaft, having the first chamber an inlet and the second chamber an outlet, said inlet and said outlet being connected to a forced cooling fluid circulation circuit so that the cooling fluid can circulate from the first chamber to the second chamber through the hollow shaft and from the second chamber to the first chamber through the circulation circuit.

The hollow shaft not only constitutes a conduit for the cooling circuit that allows the fluid to pass from one chamber to another, but also makes it possible to lighten the rotor without significantly affecting the moment of inertia generated and playing an active role in heat exchange with the rotor thanks to the fact that it crosses the container that contains the rotor for its entire longitudinal extension.

In this way, not only is the heat generated by the rotor support bearings located in correspondence of the ends of the rotor dissipated by heat exchange with the cooling chambers in which the cooling fluid circulates, but also the heat distributed inside the container housing the rotor is effectively drained.

The hollow shaft is then housed in a rotor cavity preferably of cylindrical shape which articulates along the rotation axis Y of the rotor itself; the dimensions of the hollow shaft are such as it is coaxially arranged and contained within this cavity without coming into contact with the rotor. Between the outer shell surface of the hollow shaft and the inner shell surface of the rotor, an annular interstitial chamber separating the rotor from the hollow shaft is thus created.

According to a different embodiment, the interstitial chamber is placed in a vacuum, similarly to what is intended for the container and through the interstitial chamber, by radiation, heat from the rotor is transferred to the cooling fluid circulating inside the hollow shaft. In this way, the benefits of reducing friction between a stationary part (the hollow shaft) and a part rotatable around it (the rotor) are obtained.

The gap between the rotor and the hollow shaft is preferably in the form of a cylinder having an annular cross-section and a radial thickness of a few millimeters, preferably from 1 to 5 millimeters and even more preferably of about 2 millimeters so as to allow rotation of the rotor without contact with the hollow shaft but at the same time without preventing the transfer of heat by radiation from the rotor to the hollow shaft and consequently to the fluid circulating therein.

This effect can also be increased if the exchange surfaces with the fluid inside the device are increased or, alternatively or in combination, the heat exchange with the cooling chambers is facilitated.

It is, for example, possible to provide that at least one of the two cooling chambers, preferably both cooling chambers, comprise one or more walls with an internal finned surface.

The hollow shaft itself can have a finned surface to increase heat transfer.

In an embodiment, at least one end of the rotor has a disc that rotates integrally with the rotor in proximity to one, preferably both, of the cooling chambers to increase the heat exchange between the rotor and the cooling chambers.

In particular, the disc can be coupled to the rotor so as to rotate outside the corresponding cooling chamber in proximity to a wall of the cooling chamber, specifically the wall having the internal finned surface, thus obtaining both the effect of increasing the heat exchange between the rotor and the cooling chamber and of increasing the surface of exchange with the fluid.

According to an embodiment, the device comprises one or more compartments formed in the container of the rotor. These compartments are floodable by the cooling fluid to form additional cooling chambers to the chambers located at the end of the hollow shaft. The rotor may advantageously comprise corresponding annular recesses surrounding the cooling chambers so as to increase the exchange surface between the cooling fluid and the rotor.

According to an embodiment, the rotor comprises a hub supported by the container by means of one or more bearings disposed in proximity to each of the hub ends, being provided at least one flood chamber in the container that at least partially surrounding at least one of said bearings in proximity to the bearing side integral with the container, said flood chamber comprising an inlet and an outlet connected with the fluid circulation circuit. Preferably, the flooding chambers are two, one at each hub end. Also in this case, the flooding chamber or chambers are additional to the chambers located at the ends of the hollow shaft and may be provided in combination with or as an alternative to the compartments/recesses of the container/rotor, and/or to the rotating disc or discs and/or to the finned wall or walls.

Another way to increase the exchange surface is to use a box-like element integral with the hollow shaft sealed with respect to the rotor and the container of the rotor. If the rotor has a corresponding housing adapted to receive said box-like body so as to be able to rotate around said hollow shaft and said box-like body, the heat exchange between rotor body and fluid flowing in the hollow shaft is increased, in particular if box-like body and hollow shaft are in fluid-dynamic communication so as to allow the box-like body to be flooded by the cooling fluid flowing inside the hollow shaft. Like the others, also this embodiment can be provided as an alternative or in combination with other solutions such as flooding chambers, finned wall or walls, rotating disc or discs, compartments/recesses of the container/rotor.

In a particularly advantageous configuration, the container of the rotor is sealed off from the external environment. Through the use of a vacuum pump in communication with the container, it is possible to induce vacuum inside the container so as to reduce friction, whatever type of features are adopted to increase the thermal exchange between the rotor and the cooling fluid as discussed above.

In a particularly advantageous embodiment, it is precisely the friction within the container that is exploited to cool and at the same time to slow down the rotor. For this purpose, the stabilizer may advantageously comprise a vacuum breaker device such as a valve or the like which is able to make an inert gas such as, for example, air flow on command inside the container. In this way, the effect due to fluid-dynamic forces, that it is desirable to eliminate, is used to extract heat. In fact, by introducing a gas in a controlled manner into the container, there is a sort of scavenger effect, of washing one, of removal of heat when the gas is subsequently extracted from the container and the vacuum is restored.

To achieve this effect, an actuator device may, for example, be employed which sequentially drives the vacuum breaker valve and the vacuum pump with a determined time delay so as to allow the inert gas to enter the container, exchange heat with the rotor and transfer the heat exchanged to the outside when the inert gas is evacuated by the vacuum pump to recreate the vacuum inside the container.

This controlled cooling effect through the introduction of a gas into the rotor container can obviously be provided as an alternative or in combination with all the other features seen above to increase the heat exchange, such as the flooding chambers at the ends of the hollow shaft and/or the additional flooding chamber(s) and/or the finned wall(s) and/or the rotating disc(s) and/or the compartments/recesses of the container/rotor and/or the box-like element coupled to the hollow shaft, thus creating an extremely flexible and modular device suitable to satisfy the most varied market requirements.

Further features and refinements are the subject of the dependent claims.

BRIEF DESCRIPTION OF THE DRAWINGS

The features of the invention and the advantages derived therefrom will be more evident from the following detailed description of the attached figures, wherein.

DETAILED DESCRIPTION OF EMBODIMENTS OF THE INVENTION

Figure 1:
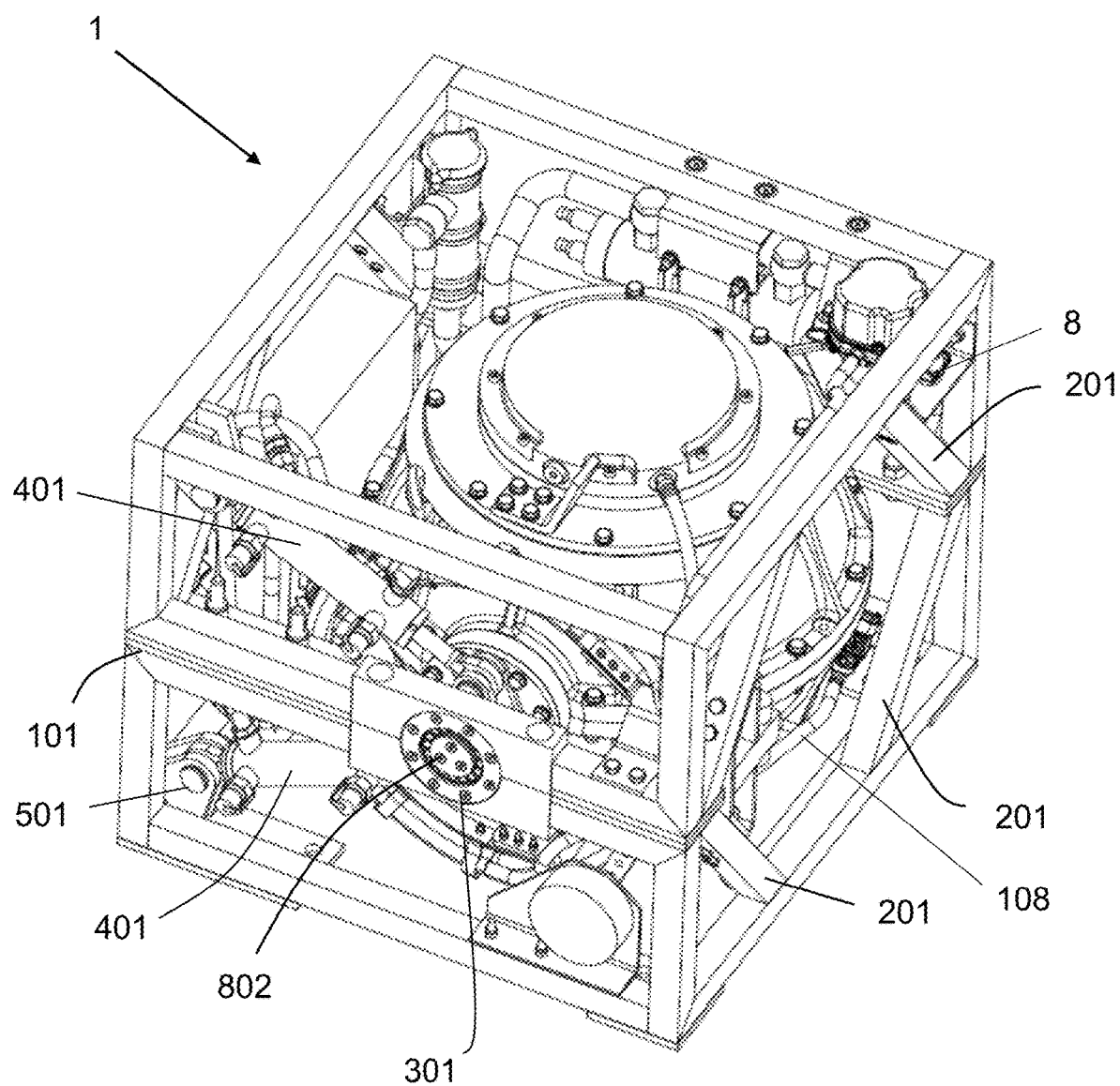
FIG. 1 shows an axonometric view of a device according to the invention mounted on a support frame.

With reference to FIGS. 1 to 4, the gyro stabilizer device according to an embodiment of the invention comprises a prismatic frame 1 with transverse support brackets 101, reinforced by means of struts 201, of a container 2 mounted on a suspension so as to be able to oscillate around a first axis X.

In the illustrated example, the container 2 comprises two half-shells 102 that are coupled via clamping flanges 202 by bolts 302 according to a direction Y orthogonal to the direction X of oscillation. The two half-shells 102, when coupled, form a spherical segment having bases symmetrical with respect to a plane passing through the direction of oscillation X. Each base of the segment represents the open leading end of the container 2.

The suspension is achieved by means of a pair of pins 402 on flanged supports 502 tightened by nuts 602 on fixing pin stumps provided on corresponding circular flattened surfaces 702. Said circular surfaces are formed by corresponding semicircular surfaces disposed, in diametrically opposite positions, in proximity to the coupling flange 202 of each half-shell 102.

Each pin 402 of the suspension engages in a corresponding housing 301 formed on the transverse support bracket 101 by means of a bearing 802 so as to allow oscillation of the container around the axis X, also known as the precession axis.

Damping of the oscillations takes place by means of a pair of hydraulic cylinders 401 hinged with an element 501 of the frame 1 and with a corresponding element 902 of one of the two flanged supports 502 of the suspension. The cylinders 401 are connected with a hydraulic circuit 601 visible in FIG. 2.

Inside the container 2 is housed a rotor 3 able to rotate around the Y axis, also known as the spin axis, transverse to the precession X axis.

The rotor 3 includes a mass 103 acting as a flywheel and a hub 203 coupled to the flywheel. The mass and hub are typically made of steel.

The hub 203 has a first end 303 and a second end 403 opposite the first end.

Inside the container 2 there are a first support device 503 and a second support device 603 suitable to support, respectively, the first 303 and the second 403 ends of the hub 203 of the rotor 3, so as to allow the relative rotation of the rotor 3 around its rotation axis Y.

Each support device 503, 603 is provided with a hub coaxial element, that element serves as a seat for the outer ring of a targeted rolling bearing 903 intended to support rotation of the hub to which it is connected via an inner bearing ring. Each support device 503, 603 is further provided with a closing flange 112 of one end of the container 2. The hub rotates relative to the coaxial element of the device 503, 603 by means of the rolling bearing 903 held in place by the retaining flange 113 tightened on the closing flange 112 by screws 123 screwed into blind holes.

The closing flanges 112 are tightened against corresponding end annular surfaces of the two half-shells 102 by screws 122 screwed into blind holes.

Inside the container 2 there is an electric motor 9 with a rotor integral with the hub 203.

On each closing flange 112 of the container 2 there is an annular spacer element 132 having a raised central portion so as to form a compartment 162 in proximity to the support bearing 903 of the hub 203. The spacer element 132 is also responsible for the vacuum-tight closure within the container of the rotor, and an inverted hollow element in the form of a lid 142 is placed thereon, defining a cooling chamber 4, 4' external to the container 2 in the proximity to its leading ends. Both the lid 142 and the annular element 132 are sealed by screws 152 screwed into blind holes. Within the scope of the present specification, the chambers 4, 4' are also identified as upper chamber and lower chamber with reference to their positions in the drawings.

There is further provided a hollow shaft 5 arranged along the spin axis Y around which the rotor 3 rotates, which connects the upper chamber 4 with the lower chamber 4'. The hollow shaft 5 may have a surface, at least partially, finned to facilitate heat exchange with the rotor.

The hollow shaft 5 is disposed in a cavity of the hub 203 of the rotor 3 and is intended to hold one or more cooling fluids.

In a preferred embodiment, the hollow shaft 5 is stationary with respect to the container 2 while the rotor 3 is installed rotatably around it by means of rolling bearings.

Advantageously, the configuration with the fixed hollow shaft avoids the wear of the seals on the heads of it. This characteristic brings important benefits with respect to the technique known especially in the field of gyroscopic stabilizers which, having to combine compact dimensions with a high moment of inertia, rotate very quickly so that the forces generated by the gyroscopic effect have an intensity such as to bring concrete stabilizing effects on the boat, a boat which has a mass and volume much greater than the desirable mass and volume for a gyroscope.

The chambers 4, 4' have an opening hole 104, 104' for connection with a conduit that is part of a cooling fluid circulation circuit. In the example shown in the figures, the opening hole 104 of the upper chamber 4 constitutes the inlet and the opening hole 104' of the lower chamber 4' constitutes the outlet so that the cooling fluid can circulate from the upper chamber 4 to the lower chamber 4' through the hollow shaft and from the lower chamber 4' to the upper chamber 4 through the pipes 606 and 706 of the circulation circuit.

Obviously, the flow may also be in the opposite direction i.e. from the lower chamber 4' to the upper chamber 4 through the hollow shaft 5 and from the upper chamber to the lower chamber through the circulation circuit.

Figure 2:
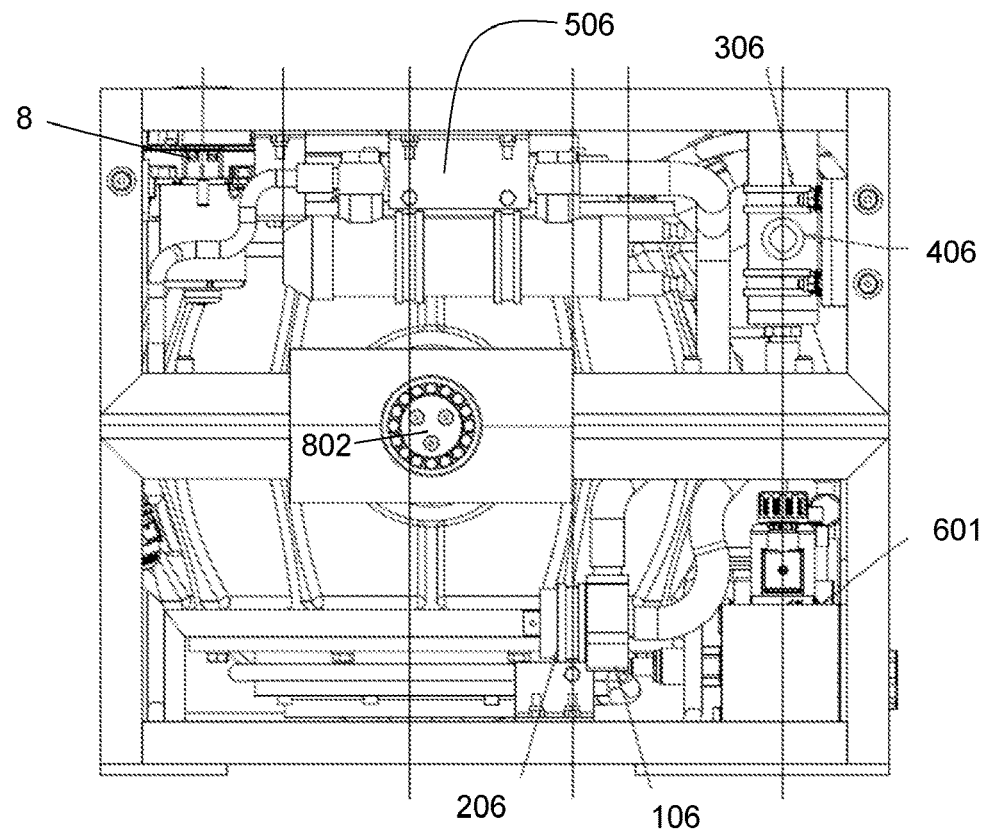
FIGS. 2 and 3 show, respectively, a side and top view of the device of the preceding figure.

Referring to FIG. 2, the circulation circuit includes a pump 106 attached to the frame by collar 206, an expansion tank 306 with a visual level indicator 406 of the cooling fluid (typically water and glycol), and a heat exchanger 506 for heat exchange between the fluid and the external environment.

Figure 5:
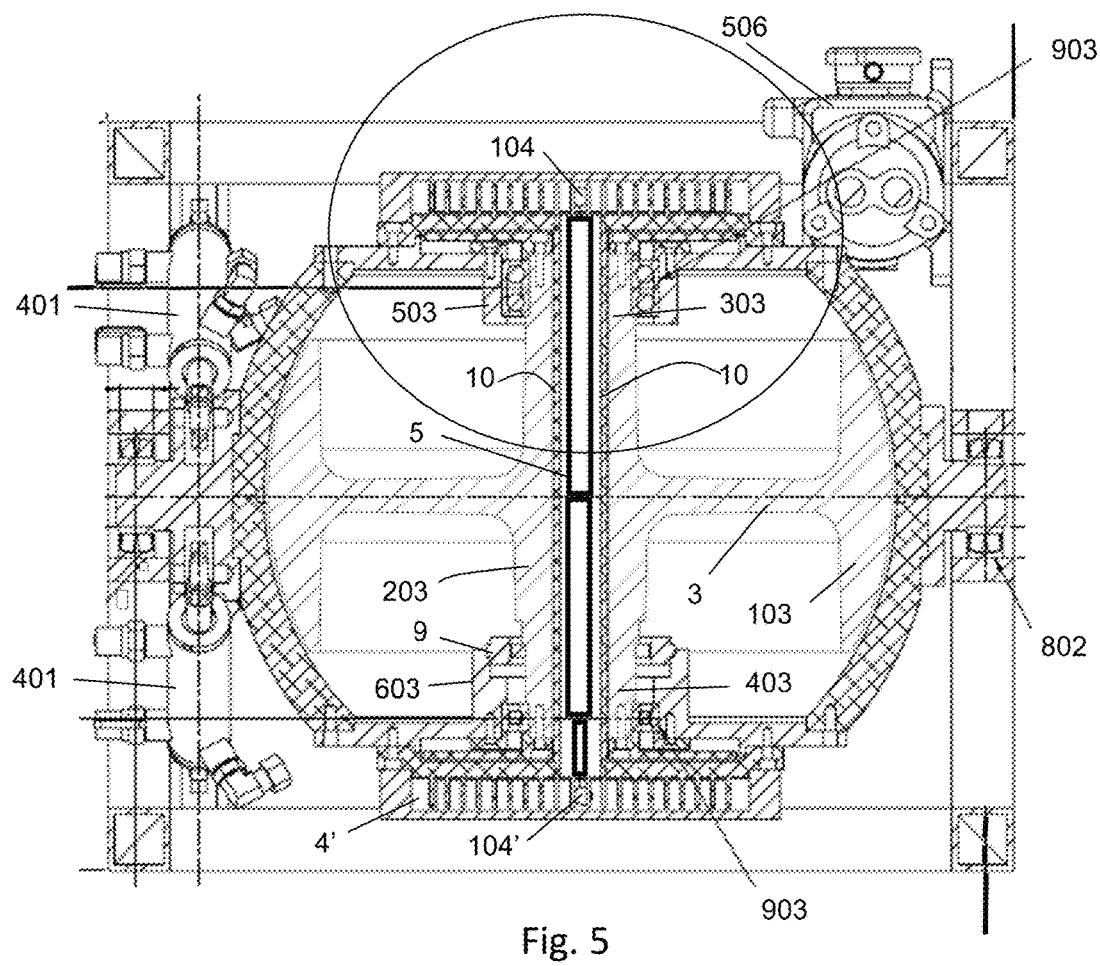
FIG. 5 shows a longitudinal section of a device according to an embodiment of the invention.
Figure 6:
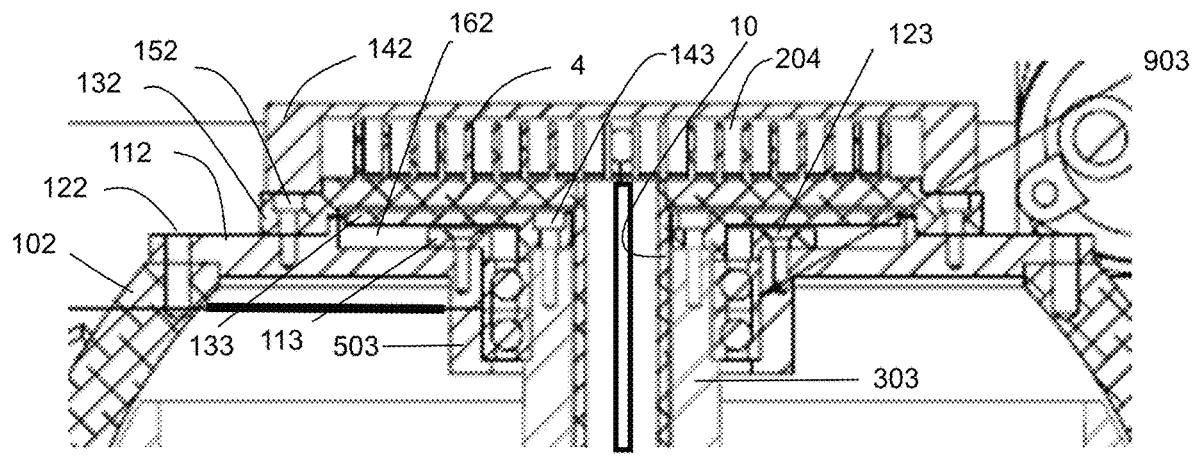
FIG. 6 shows the detail of the upper head of the rotor of the device of the previous figure.
Figure 7:
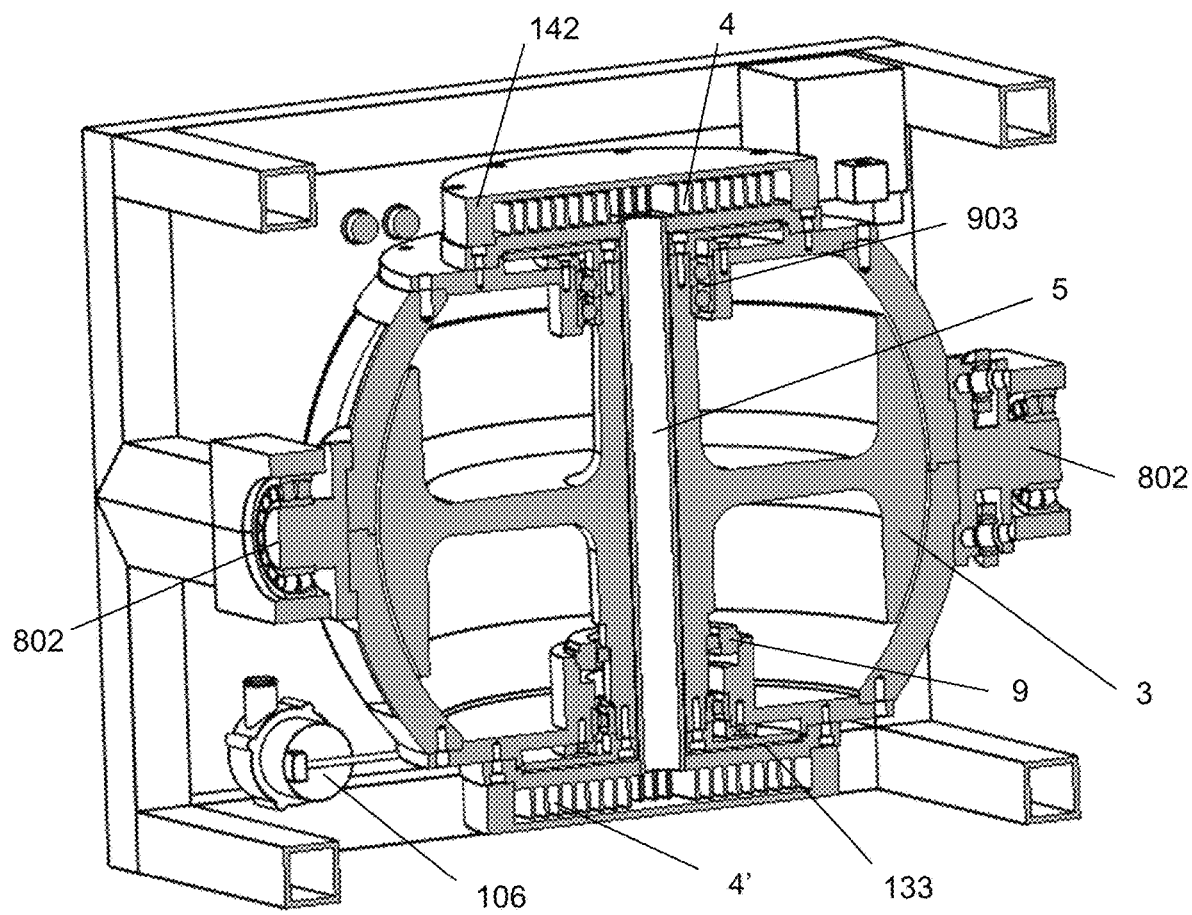
FIG. 7 shows a view section of the implementation form in FIGS. 5 and 6.

In the embodiment shown in FIGS. 5 to 7, the chambers 4, 4' have the innermost wall 204 finned to facilitate heat exchange with the cooling fluid. There is also present a disc 133 integral with the hub of the rotor that rotates inside the compartment 162 obtained in the leading end of the container 2. The disc 133 is fixed to the hub with screws 143 screwed on blind holes.

The disc 133 facilitates the heat exchange between the rotor 3, in particular between the bearings 903, and the corresponding cooling chamber 4, 4'. In the figures, a configuration with discs 133 at both ends of the hub 203 of the rotor 3 is shown, but obviously it is also possible to provide for only one or none of them since it is a completely optional component like the fins on one wall of the cooling chambers 4, 4'. Also in this case, in fact, the fins 204 can be present in only one, in both or in none of the two chambers in the presence of one, two or no disc 133.

In FIGS. 5 and 6, the interstitial chamber separating the hub 203 of the rotor 3 from the hollow shaft 5 is indicated by the numerical reference 10.

Said interstitial chamber 10 is radially defined by the outer shell surface of the hollow shaft 5 and the inner shell surface of the rotor 203 and thus extends along the axis Y of the device as shown in the figure. According to a preferred embodiment which can be realized in combination or sub-combination with other embodiments of the invention, the interstitial chamber 10 is placed in a vacuum so as to reduce the friction between the rotor and the hollow shaft. The radial thickness of said interstitial chamber 10 is such as to prevent contact between hollow shaft 5 and rotor 203, and at the same time the thickness is small so as to facilitate the transfer of heat by radiation to the hollow shaft 5 containing the cooling fluid.

Figure 8:
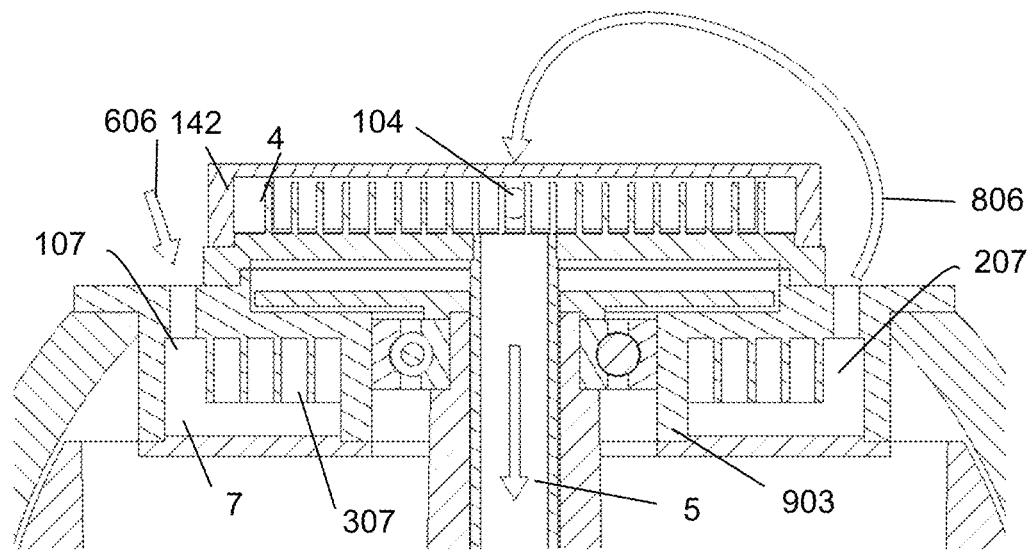
FIG. 8 shows the same view as FIG. 6, but with reference to another embodiment of the invention.
Figure 9:
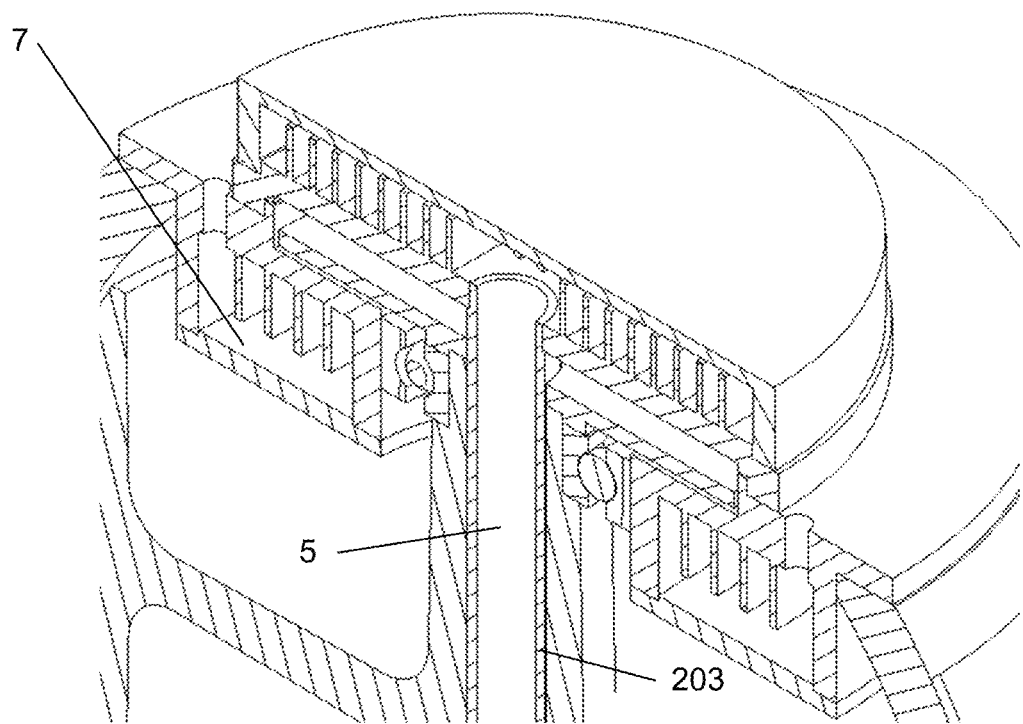
FIG. 9 shows a corresponding three-dimensional view of the embodiment in the preceding figure.

FIGS. 8 and 9 show another embodiment in which the closing flange 112 has an annular recess adapted to forming a flooding chamber 7 in the container 2 that at least partially surrounds at least one of the two bearings in proximity to the bearing side 903 integral with the container 2. The flooding chamber 7, which may be present at only one end or at both ends of the rotor 3 and have one or more finned walls 307, includes an inlet 107 and an outlet 207 connected with the fluid circulation circuit. In order to obtain the configuration shown in FIG. 8, the supply pipe 606 illustrated in FIG. 4, instead of being connected directly to the inlet 104 of the cooling chamber 4, is connected to the inlet 107 of the flooding chamber 7. It will then be the outlet 207 of the same flooding chamber 7 that will be connected via a fitting 806 with the inlet 104 of the cooling chamber 4 to close the fluid circulation circuit.

Similar connections can be made with additional flooding chambers (not shown in the figures) obtained in the container to increase the heat exchange with the rotor 3.

The rotor 3 may advantageously comprise corresponding annular recesses surrounding the cooling chambers so as to increase the exchange surface between the cooling fluid and the rotor itself.

Figure 10:
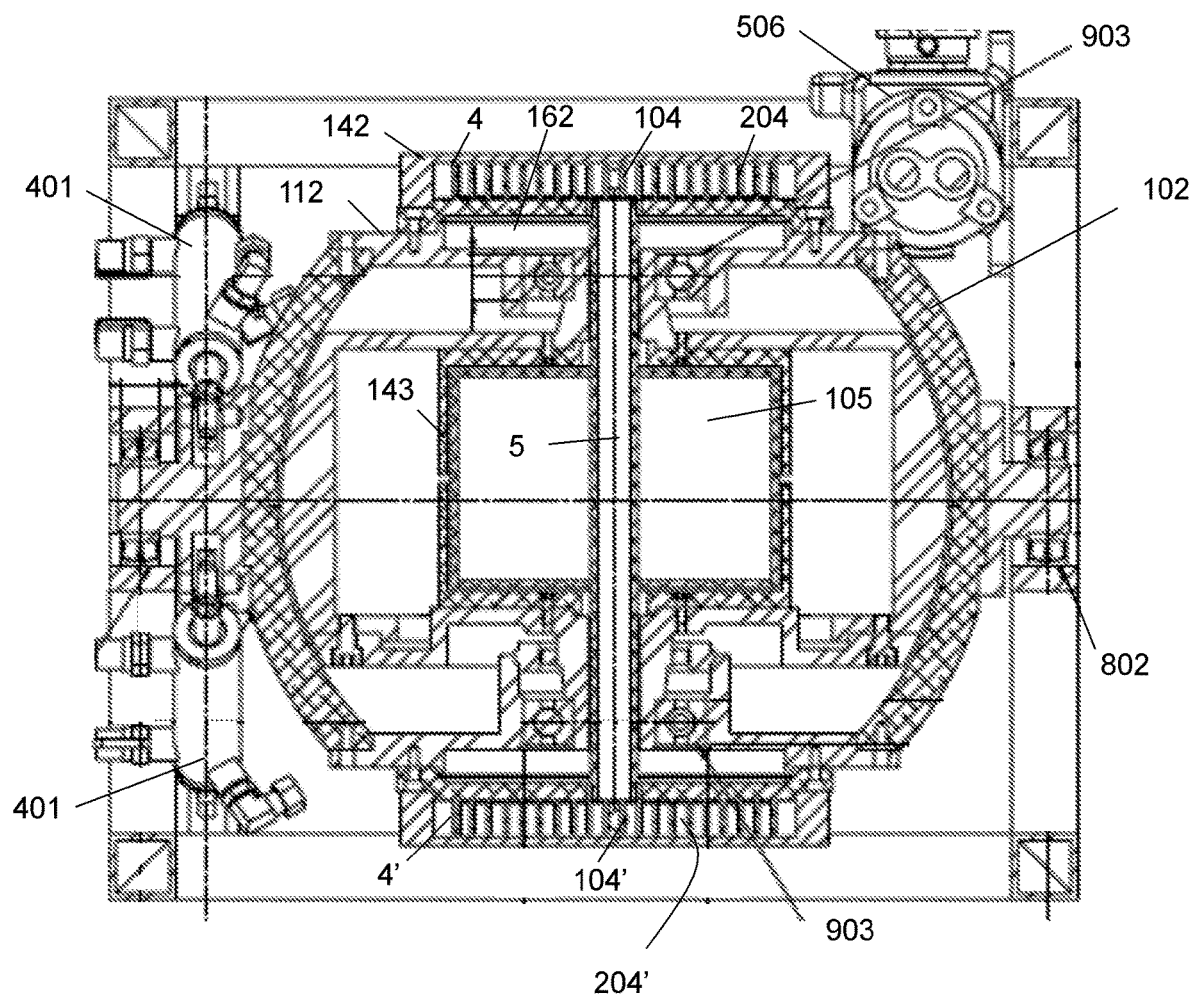
FIG. 10 shows a longitudinal section of a device according to another embodiment of the invention.
Figure 11:
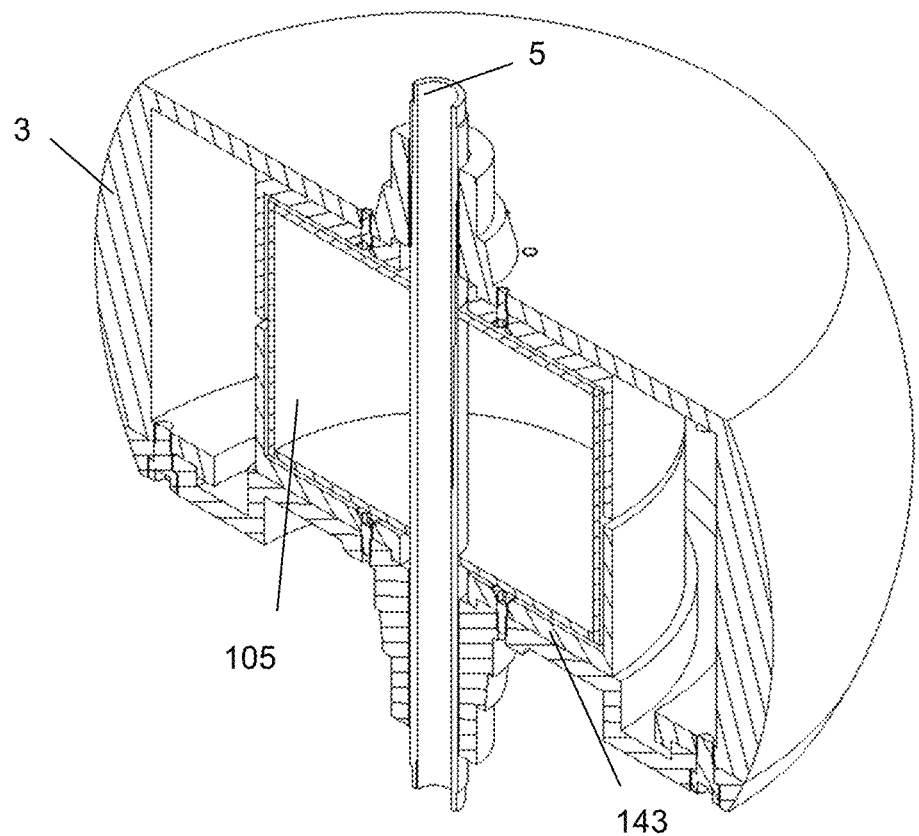
FIG. 11 shows a corresponding three-dimensional view of the embodiment in the preceding figure.

Another way to increase the exchange surface, to be used alternatively or in combination with the solutions described so far, is to use a box-like body 105 integral with the hollow shaft 5 sealed with respect to the rotor 3 and the container 2 of the rotor as shown in FIGS. 10 and 11. The rotor 3 has a corresponding housing 143 adapted to receive said box-like body 105 so as to be able to rotate around the hollow shaft 5 and the box-like body 105. In this way, the heat exchange between the body of the rotor 3 and the fluid flowing in the hollow shaft 5 is increased in particular if the box-like body 105 and the hollow shaft 5 are in fluid-dynamic communication so as to allow the box-like body 105 to be flooded by the cooling fluid flowing inside the hollow shaft 5.

In this embodiment, the rotating disc 133 of the embodiment shown in FIG. 5 is not present, but may obviously be equally present at one or both ends of the rotor 3 since it is an entirely optional component. The same with regard to the finned surface or surfaces 204 which may be present in one, both or none of the cooling chambers 4, 4'.

Figure 3:
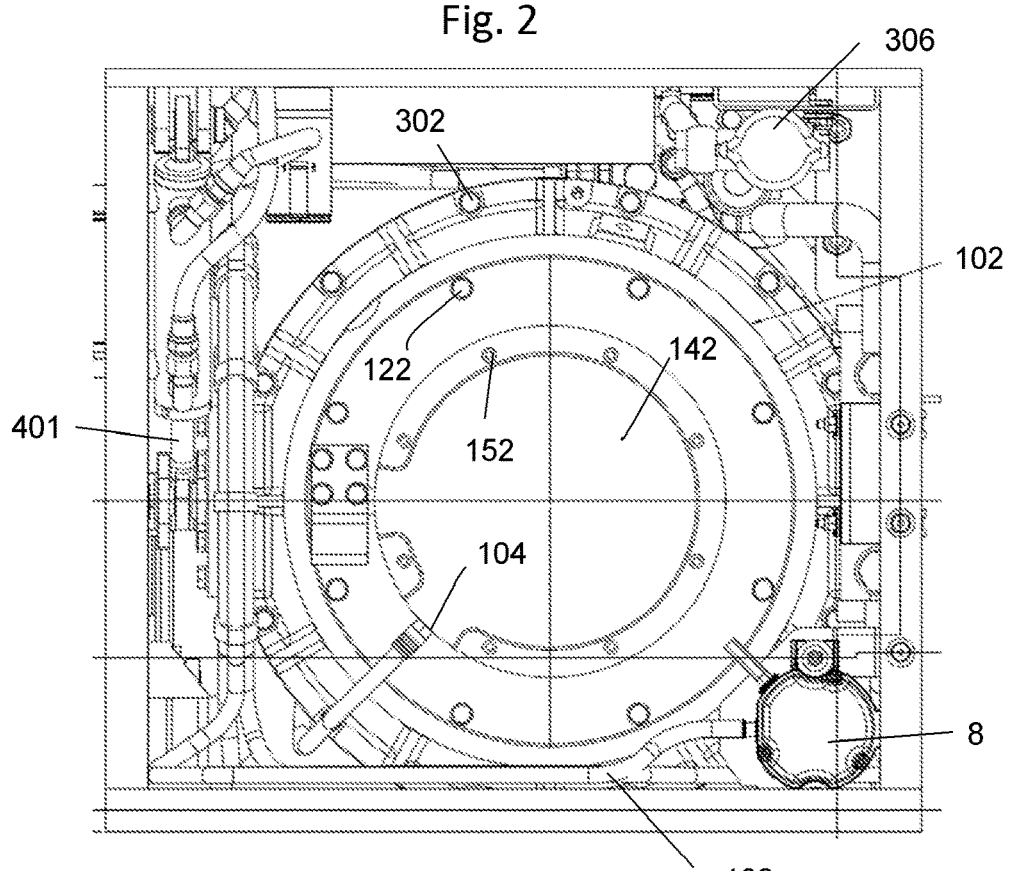
Figure 4:
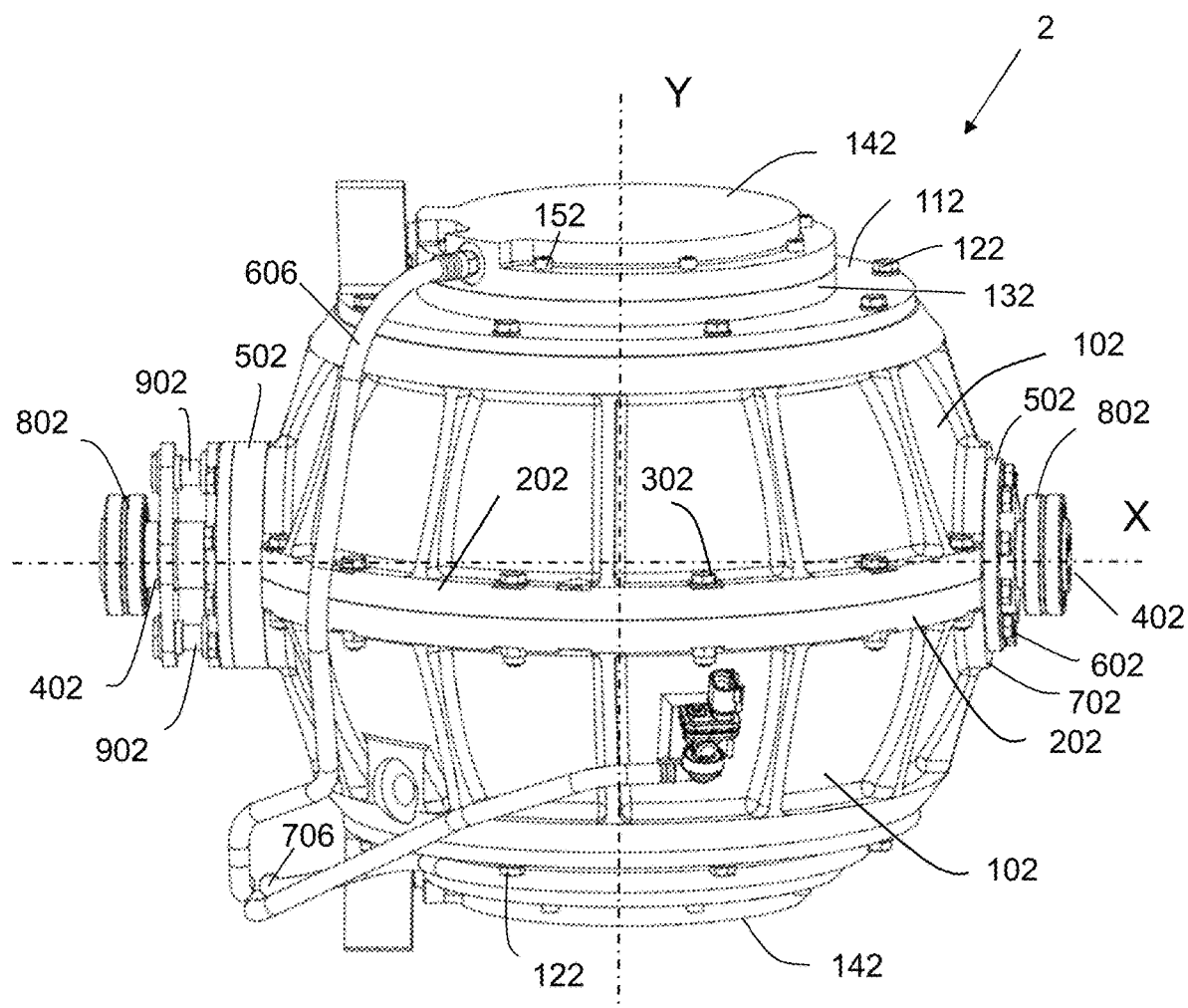
FIG. 4 shows an axonometric detail view of the container shown in the preceding figures without the support frame.

The stabilizer device is completed by a vacuum pump 8 in communication with the container 2 through the pipes 108 visible in FIG. 3 to induce vacuum inside the container so as to reduce friction, whatever type of feature is adopted to increase the heat exchange between the rotor and the cooling fluid as discussed above.

In a particularly advantageous embodiment, it is indeed the friction within the container that is exploited to cool and at the same time to slow down the rotor. For this purpose, the stabilizer may advantageously comprise a vacuum breaker device such as a valve or the like which is capable of making an inert gas, such as, for example, air, helium or hydrogen, flow on command inside the container 2. In this way, precisely the effect due to the fluid-dynamic forces which it is desirable to eliminate is used to extract heat. By introducing, in fact, a gas in a controlled manner into the container 2, a sort of scavenger effect is created, a washing one, a heat removal when the gas is subsequently extracted from the container and the vacuum restored.

To achieve this effect, an actuator device may, for example, be employed, for example driven by a control unit, which sequentially drives the vacuum breaker valve and the vacuum pump 8 with a time delay determined so as to allow the inert gas to enter the container, to exchange heat with the rotor and to transfer the heat exchanged outside when the inert gas is evacuated by the vacuum pump to recreate the vacuum inside the container 2.

This controlled cooling effect by vacuum breaking within the container of the rotor can obviously be employed in any embodiment of the invention.

It is also possible to provide that the control unit is interfaced not only with the vacuum pump 8 and the vacuum breaker valve but also with the electric motor 9. The control unit can thus be configured to open the inert gas inlet valve in the container 2 in correspondence of a command of reducing the rotation of the motor 9. The motor is made to run freely during the inert gas inlet. After that, the vacuum is recreated, and the motor is accelerated again to restore the desired angular momentum. This reduces power consumption. The braking effect of viscous friction can also be used to achieve a gradual reduction in rotor inertia over a short period of time, for example at the end of navigation.

The same control unit can advantageously be interfaced with the hydraulic system 601 controlling the cylinders 401 to correspondingly dampen oscillations around the precession axis X.

The invention claimed is:

1. An anti-roll stabilizer device for boats comprising:
a container adapted to be mounted on a suspension so as to be able to oscillate around a first axis;
a mass rotatably supported inside the container so as to form a rotor, which rotates around a hub of the rotor arranged along a second axis, transverse to the first axis;
a rotor cooling system,
wherein the rotor cooling system comprises:
a cooling fluid;

a hollow shaft arranged along the second axis within the hub, the hollow shaft being stationary with respect to the container; and a first and a second cooling chamber sealed with respect to the container of the rotor and toward an external environment, arranged at ends of the hollow shaft and communicating through the hollow shaft, the first cooling chamber having an inlet and the second cooling chamber having an outlet, the inlet and the outlet being connected to a forced circulation circuit of the cooling fluid so that the cooling fluid can circulate from the first cooling chamber to the second cooling chamber through the hollow shaft, and from the second cooling chamber to the first cooling chamber through the forced circulation circuit.

2. The anti-roll stabilizer device according to claim 1, wherein the forced circulation circuit of the cooling fluid comprises a pump, a fluid refilling tank and/or a heat exchanger for transferring heat accumulated by the cooling fluid to the external environment.

3. The anti-roll stabilizer device according to claim 1, wherein at least one of the first and the second cooling chambers includes a wall with an internal finned surface to facilitate heat exchange between the wall and the cooling fluid.

4. The anti-roll stabilizer device according to claim 1, wherein the hollow shaft has an at least partially finned surface.

5. The anti-roll stabilizer device according to claim 1, wherein at least one end of the rotor has a disk, which rotates integrally with the rotor adjacently to one of the first and the second cooling chambers to increase heat exchange between the rotor and the one of the first and the second cooling chambers.

6. The anti-roll stabilizer device according to claim 5, wherein the disk is coupled to the rotor so as to rotate outside a corresponding cooling chamber adjacently to a wall of the corresponding cooling chamber.

7. The anti-roll stabilizer device according to claim 1, further comprising one or more compartments obtained in the container of the rotor, the one or more compartments being floodable by the cooling fluid to form additional cooling chambers.

8. The anti-roll stabilizer device according to claim 7, wherein the rotor comprises corresponding annular recesses which surround the additional cooling chambers so as to increase an exchange surface between the cooling fluid and the rotor.

9. The anti-roll stabilizer device according to claim 1, wherein the rotor has a hub supported by the container with one or more bearings arranged adjacently to ends of the hub, further comprising one or more flooding chambers in the container, the one or more flooding chambers at least partially surrounding at least one of the bearings adjacently to a side of the at least one of the bearings integral with the container, the one or more flooding chambers comprising an inlet and an outlet connected to the forced circulation circuit.

10. The anti-roll stabilizer device according to claim 9, wherein the one or more flooding chambers have one or more walls with a finned surface.

11. The anti-roll stabilizer device according to claim 1, further comprising a box-shaped body integral with the hollow shaft sealed with respect to the rotor and to the container of the rotor, the rotor having a corresponding housing adapted to receive the box-shaped body so as to be able to rotate around the hollow shaft and the box-shaped body.

12. The anti-roll stabilizer device according to claim 11, wherein the box-shaped body and hollow shaft are in fluid dynamic communication so that the box-shaped body is flooded by the cooling fluid flowing in the hollow shaft.

13. The anti-roll stabilizer device according to claim 1, wherein the container of the rotor is sealed with respect to the external environment, further comprising a vacuum pump in communication with the container to induce vacuum inside the container.

14. The anti-roll stabilizer device according to claim 13, further comprising a vacuum breaker valve configured to make an inert gas flow on command.

15. The anti-roll stabilizer device according to claim 14, further comprising an actuator which sequentially controls the vacuum breaker valve and the vacuum pump with a defined time delay so as to allow the inert gas to enter the container, to exchange heat with the rotor and to transfer the heat exchanged outside when the inert gas is evacuated by the vacuum pump to recreate the vacuum inside the container.

16. The anti-roll stabilizer device according to claim 14, further comprising:

an electric motor disposed inside the container, the electric motor having a shaft adapted to transmit a torque to one end of the rotor; and a control unit interfaced with the vacuum pump, the vacuum breaker valve and the electric motor, and configured to open the vacuum breaker valve for introducing the inert gas into the container in correspondence with a reduction of motor rotation.

17. The anti-roll stabilizer according to claim 1, further comprising an interstitial chamber separating the hub from the hollow shaft.

\* \* \* \* \*